United States Patent
Tate, Jr.

(10) Patent No.: US 9,074,894 B2
(45) Date of Patent: Jul. 7, 2015

(54) VEHICLE RANGE PROJECTION ESTIMATION

(71) Applicant: GM Global Technology Operations LLC, Detroit, MI (US)

(72) Inventor: Edward D. Tate, Jr., Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 79 days.

(21) Appl. No.: 13/936,616

(22) Filed: Jul. 8, 2013

(65) Prior Publication Data

US 2015/0012207 A1 Jan. 8, 2015

(51) Int. Cl.
G01C 21/00 (2006.01)

(52) U.S. Cl.
CPC ..................................... G01C 21/00 (2013.01)

(58) Field of Classification Search
CPC ...................................................... G01C 21/00
USPC ........................................................ 701/119
See application file for complete search history.

(56) References Cited

U.S. PATENT DOCUMENTS

| | | | |
|---|---|---|---|
| 6,360,165 B1* | 3/2002 | Chowdhary | 701/495 |
| 8,818,680 B2* | 8/2014 | Isaji et al. | 701/96 |
| 2005/0267608 A1* | 12/2005 | Nishira et al. | 700/44 |
| 2008/0120025 A1* | 5/2008 | Naitou et al. | 701/207 |
| 2009/0037088 A1* | 2/2009 | Taguchi | 701/117 |
| 2009/0099724 A1* | 4/2009 | Kranz et al. | 701/35 |
| 2010/0010699 A1* | 1/2010 | Taguchi et al. | 701/23 |
| 2010/0036578 A1* | 2/2010 | Taguchi et al. | 701/93 |
| 2010/0042282 A1* | 2/2010 | Taguchi et al. | 701/25 |
| 2010/0138142 A1* | 6/2010 | Pease | 701/123 |
| 2011/0080302 A1* | 4/2011 | Muthaiah et al. | 340/903 |
| 2011/0125357 A1* | 5/2011 | Harumoto et al. | 701/22 |
| 2013/0080019 A1* | 3/2013 | Isaji et al. | 701/96 |
| 2013/0226367 A1* | 8/2013 | MacNeille et al. | 701/1 |
| 2014/0074390 A1* | 3/2014 | Williams et al. | 701/123 |
| 2014/0310075 A1* | 10/2014 | Ricci | 705/13 |
| 2014/0310788 A1* | 10/2014 | Ricci | 726/6 |

* cited by examiner

Primary Examiner — Mary Cheung
Assistant Examiner — Frederick Brushaber
(74) Attorney, Agent, or Firm — Cantor Colburn LLP

(57) ABSTRACT

Vehicle range projection estimation is implemented by a computer processor of a vehicle having logic executable thereon. The logic receives vehicle range projection data from a remote system over a network as a network service. The vehicle range projection data represents a bounded geographic area in which the vehicle is capable of traveling. The bounded geographic area is defined by global positioning system coordinates attributable to the vehicle in conjunction with an available amount of remaining energy of the vehicle. The logic also stores the vehicle range projection data in a storage device. Upon determining an interruption in a network service has occurred, the logic retrieves stored vehicle range projection data from the storage device, scales the stored vehicle range projection data to a level commensurate with an updated amount of remaining energy of the vehicle, and displays a visual representation of scaled vehicle range projection data in the vehicle.

20 Claims, 5 Drawing Sheets

VEHICLE RANGE PROJECTION ESTIMATION

FIELD OF THE INVENTION

The subject invention relates to data processing, and more particularly, to estimating a geographically reachable area for a vehicle when a service that provides remote vehicle range projection becomes unavailable.

BACKGROUND

Global positioning systems (GPSs), handheld devices, and online map routing services provide mechanisms to navigate from one point to another by calculating paths based on information derived from roadway maps. Routing systems typically have usability features to automatically calculate the type of directions desired. The usability features allow an operator to specify routing objectives such as: shortest distance (using an algorithm to determine the shortest distance from one point to the next); least amount of travel time (using an algorithm to determine the shortest distance based on the road's speed limit and distance, and calculating, the resulting driving time); least use of freeways; least use of energy (gasoline and/or electricity); and least use of toll roads.

Routing systems (also referred to herein as mapping engines) typically include cartographic maps and map databases to determine an appropriate driving route. The map databases represent a network of roads and often include information about toll roads, speed limits, highway exit points, and points of interest (POIs). The map databases also include points on a map (also known as waypoints) represented in the form of latitudes and longitudes, universal transverse Mercator (UTM) coordinates, and/or geospatial coordinates. Some examples of waypoints include POIs (e.g., museums, restaurants, railways, exit points, etc.), user-entered destinations, and fixed reference points along a route. These waypoints can be marked on maps in the routing systems.

A route is a series of two or more waypoints. in order to determine a suggested route, a routing system first determines a set of waypoints between a starting point and a destination point. The muting system then guides a user to a nearest waypoint along the route, then to the next waypoint in the route, and so on, until the user reaches the destination point. A typical routing system resolves the starting point and the destination point into its nearest known waypoints on the network and then uses a "great circle routing algorithm" to determine a route between two points. Sonic routing systems also use a search algorithm to search a graph of nodes (representing waypoints) and edges (representing paths between waypoints). Some examples of search algorithms that can be used to determine a route between two points are Dijkstra's algorithm (to determine the shortest path), an A* algorithm (to determine the shortest path along a weighted graph), and a bi-directional search algorithm.

Routing systems are designed to take into account routing objectives when determining a route between two points. However, a vehicle operator may also be constrained by other factors that impact a range that the vehicle can travel. For example, when selecting POIs, an operator may only have a specified amount of time to travel to the POI. In another example, an operator of an electric vehiclie may be looking for a recharge station that is within a selected kilowatt hour (kwHr) range of the current location of the vehicle. Thus, determining a range of geographic locations that a vehicle can visit based on both routing objectives can be very useful.

Vehicles utilizing routing systems that operate over a network for performing routing calculations are subject to incidences of service interruptions (e.g., delays in transmission due to congested networks, temporary outages due to weather or other conditions, etc.). In these situations, the vehicle is unable to obtain up-to-date routing and range projection information. What is needed, therefore, is a way for a vehicle to perform "on-board" estimations for vehicle range projections when a service interruption or delay occurs.

SUMMARY OF THE INVENTION

In one exemplary embodiment of the invention, a system for providing vehicle range projection estimation is provided. The system includes a computer processor disposed in a vehicle and logic executable by the computer processor. The logic is configured to implement a method. The method includes receiving vehicle range projection data from a remote system over a network as a network service. The vehicle range projection data represents a bounded geographic area in which the vehicle is capable of traveling. The bounded geographic area is defined by global positioning system coordinates attributable to the vehicle in conjunction with an available amount of remaining energy of the vehicle. The method also includes storing the vehicle range projection data in a storage device. Upon determining an interruption in the network service has occurred, the method includes retrieving stored vehicle range projection data from the storage device, scaling the stored vehicle range projection data to a level commensurate with an updated amount of remaining energy of the vehicle, and displaying a visual representation of scaled vehicle range projection data in the vehicle.

In another exemplary embodiment of the invention, a method for providing vehicle range projection estimation is provided. The method includes receiving vehicle range projection data from a remote system over a network as a network service. The vehicle range projection data represents a bounded geographic area in which the vehicle is capable of traveling. The bounded geographic area is defined by global positioning system coordinates attributable to the vehicle in conjunction with an available amount of remaining energy of the vehicle. The method also includes storing the vehicle range projection data in a storage device. Upon determining an interruption in the network service has occurred, the method includes retrieving stored vehicle range projection data from the storage device, scaling the stored vehicle range projection data to a level commensurate with an updated amount of remaining energy of the vehicle, and displaying a visual representation of scaled vehicle range projection data in the vehicle.

In yet another exemplary embodiment of the invention a computer program product for implementing vehicle range projection estimation is provided. The computer program product includes a computer-readable storage medium having instructions embodied thereon, which when executed by a computer, cause the computer to implement a method. The method includes receiving vehicle range projection data from a remote system over a network as a network service. The vehicle range projection data represents a bounded geographic area in which the vehicle is capable of traveling. The bounded geographic area is defined by global positioning system coordinates attributable to the vehicle in conjunction with an available amount of remaining energy of the vehicle. The method also includes storing the vehicle range projection data in a storage device. Upon determining an interruption in the network service has occurred, the method includes retrieving stored vehicle range projection data from the storage device, scaling the stored vehicle range projection data to a level commensurate with an updated amount of remaining energy of the vehicle, and displaying a visual representation of scaled vehicle range projection data in the vehicle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
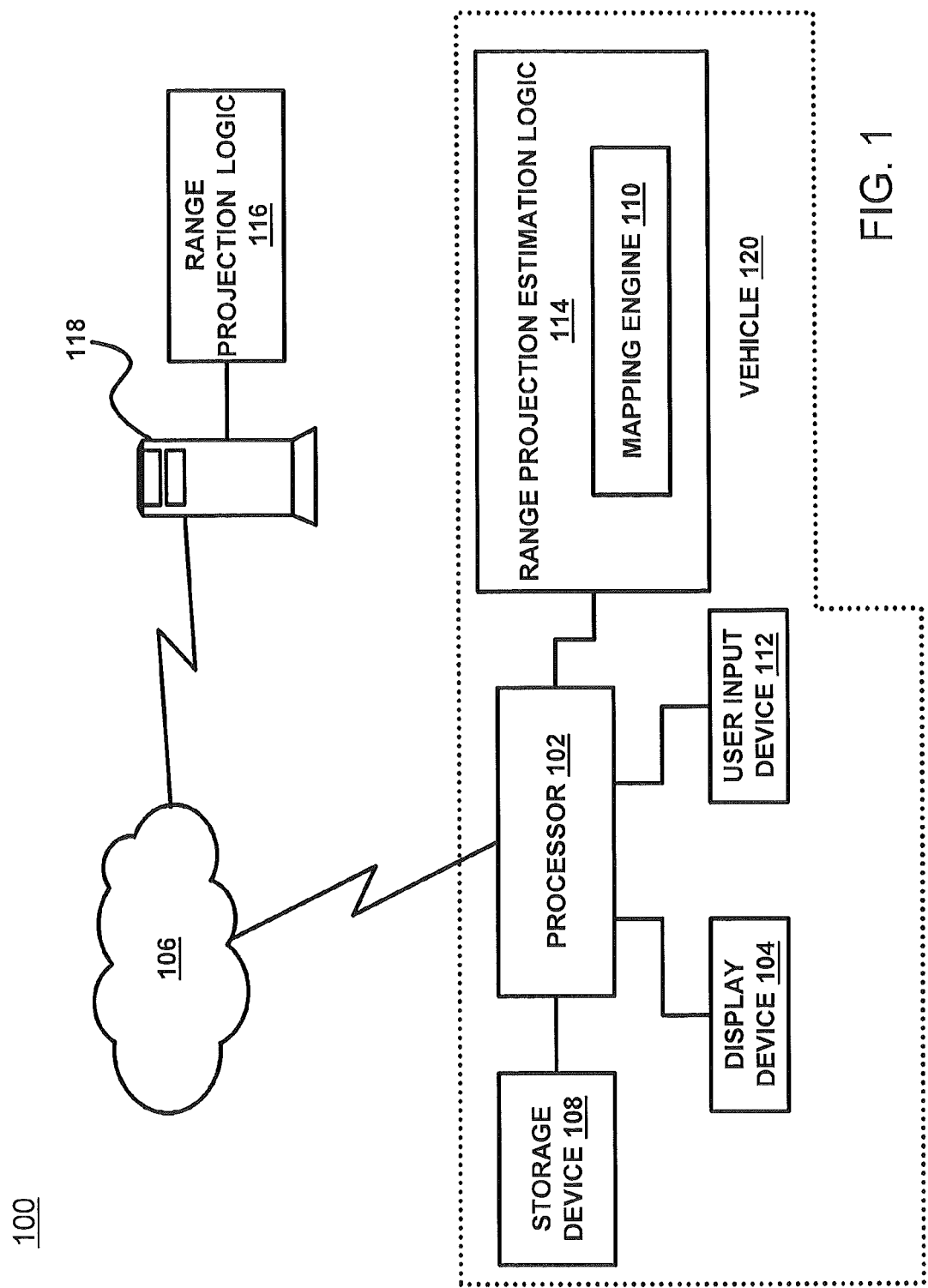
FIG. 1 is a system upon which vehicle range projection estimation may be implemented in accordance with an exemplary embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, an estimated travel range of a vehicle is determined offline by the vehicle or other offline device in response to a service interruption or delay.

Prior to a service interruption or delay, information about the projected travel range of the vehicle may be calculated by a remote network system that is output to a display device in the vehicle and presented, via the display device, to the operator of the vehicle or to a passenger in the vehicle. This projected travel range may then be used, for example, to select one or more points of interest along a route to a destination that meet a specified travel constraint(s). However, when a service interruption occurs that prevents the remote network system from calculating the projected travel range of the vehicle, the exemplary processes described herein enable the vehicle to utilize a snapshot of the most recent range projection information, as well as other data from the vehicle, to estimate a travel range without the benefit of the remote network system. Once the service has been restored, the vehicle may then continue to receive projected travel range information from the remote network system.

In an embodiment, the vehicle is a limited range powertrain vehicle such as a battery electric vehicle (BEV) or an extended range electric vehicle (EREV), and the travel constraint is an electricity range of the vehicle. In another embodiment, the vehicle is a gasoline powered automobile.

Turning now to FIG. 1, a system 100 upon which vehicle range projection may be implemented in an exemplary embodiment will now be described. The system 100 shown in FIG. 1 includes components of a vehicle 120, which in turn includes a processor 102, range projection estimation logic 114, a storage device 108, a display device 104, and a user input device 112. The processor 102 may be implemented by any computer processor that is suitable for being located in the vehicle 120 and for performing the vehicle range projection estimation described herein. In an exemplary embodiment, the components are integrated into or are part of a vehicle control module such as, for example, an infotainment control module or a navigation control module. Though not shown, the system 100 may also include an antenna for communicating with a wireless communication network.

The user input device 112 typically includes a keypad or a keyboard for allowing a user to input information. In an embodiment, the display device 104 is a liquid crystal display (LCD) screen that is used to display graphics and text. Although FIG. 1 illustrates the user input device 112 and the display device 104 as separate components it is to be understood that the user input device 112 and the display device 104 may be a combined unit as well. For example, in an embodiment the display is a touchscreen that detects the presence and location of a user's touch.

In an embodiment, the system 100 is in communication with or includes a global positioning satellite ("GPS") receiver that is in communication with a satellite (not shown) and a host system 118 for providing information regarding a current (or starting) location of the vehicle. Alternatively, the current (or starting) location of the vehicle is determined by obtaining user input. Specifically, the user may input current location information into a keypad or keyboard or touch screen of the user input device 112. In an embodiment, the range projection estimation logic 114 includes a mapping engine for providing vehicle range projection estimations when a remote connection to the host system 118 and satellite is interrupted, as described herein.

The range projection estimation logic 114 may be a program that is included with the system 100 in a vehicle at the time of manufacture. Alternatively, the range projection estimation logic 114 is a downloadable application that is saved in the storage device 108 of the vehicle 120 after manufacture.

The host system 118 is in communication with the vehicle 120 over one or more networks 106. As shown in FIG. 1, the host system 118 may be implemented by an enterprise for providing vehicle range projection and is configured with range projection logic 116 for performing vehicle range projection calculations. In one embodiment, the host system 118 is implemented by an application service provider (ASP) to provide vehicle range projection to end users (e.g., vehicle consumers). The host system 118 may be implemented as a high-speed computer processing device (e.g., a mainframe computer) capable of handling a high volume of activities conducted between the host system 118 and the network entities shown in FIG. 1.

As described previously, travel constraints are vehicle range restrictions such as distance or travel time. In an embodiment, a user sets the travel constraints through the user input device 112. Alternatively a travel constraint is set automatically by the range projection logic 114 based on one or more known vehicle states (e.g., amount of remaining fuel or energy).

The networks 106 may be any type of known networks in the art. For example, the networks 106 may be a combination of public (e.g., Internet), private (e.g., local area network, wide area network, virtual private network), and may include wireless and wireline transmission systems (e.g., satellite, cellular network, terrestrial networks, etc.).

While the range projection estimation logic 114 is shown in FIG. 1 as being implemented in the vehicle, e.g., in a vehicle control module such as, for example, an infotainment control module or a navigation control module), it will be understood that the range projection estimation logic 114 may be implemented in alternative locations. For example, in an alternative embodiment, the range projection estimation logic 114 may be implemented on a personal digital device such as, but not limited to, a cellular telephone or tablet computer.

The mapping engine 110 includes a mapping tool that takes as input a starting location (e.g., address) and a destination location and returns as output one or more routes to follow to get from the starting location to the destination location subject to routing objectives. The mapping engine 110 accesses a database of maps (e.g., stored in the storage device 108) for generating the routes. The mapping engine 110 may be a proprietary tool or a commercial application, such as Google Maps®.

Figure 2:
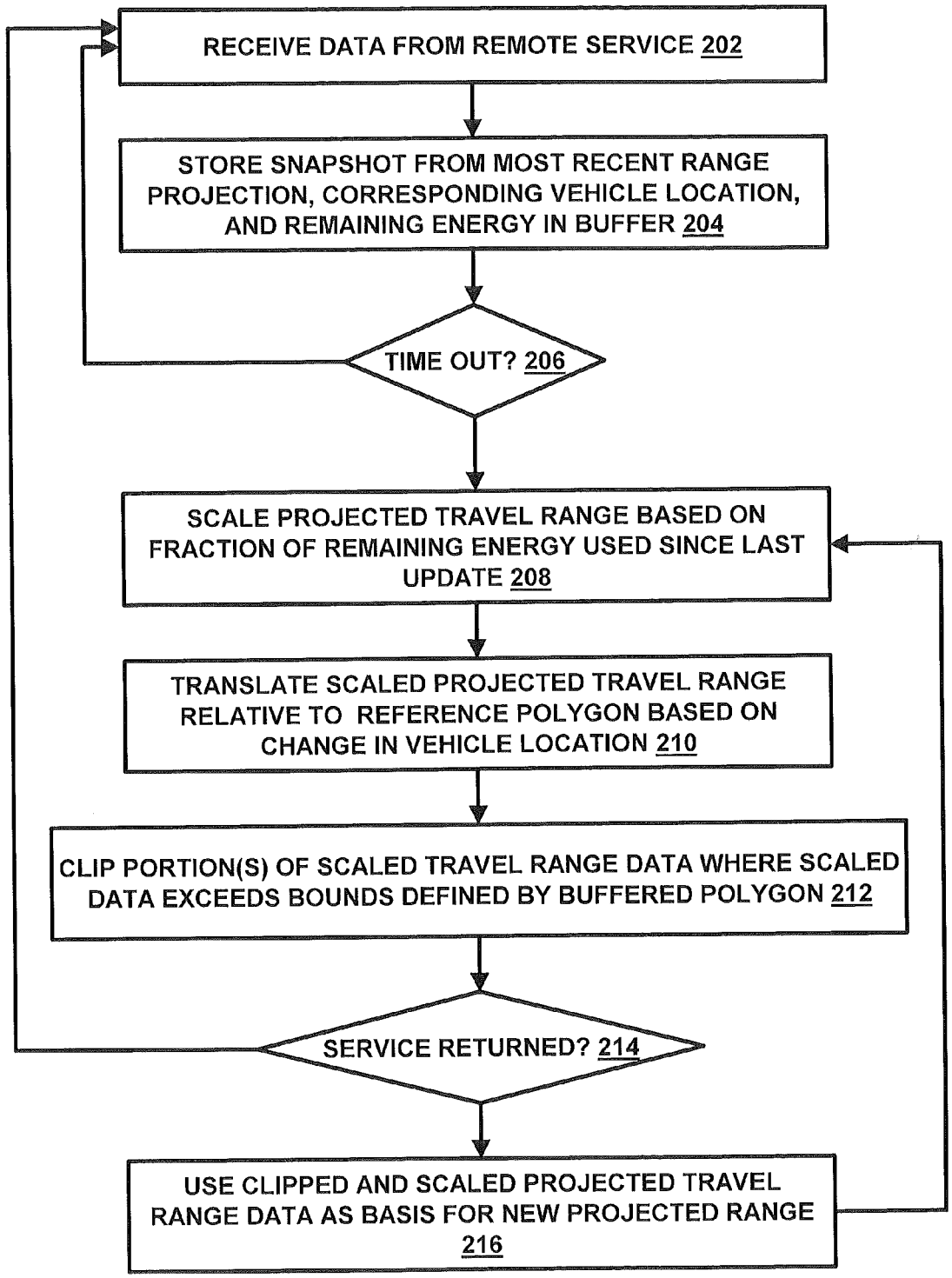
FIG. 2 is a flow diagram describing a process for implementing vehicle range projection estimation in accordance with an exemplary embodiment of the invention.

FIG. 2 is a flow diagram describing a process for implementing vehicle range projection estimation in accordance with an exemplary embodiment. As indicated above, vehicle range projection estimation enables an operator to receive information about the locations that a vehicle can visit once a service interruption has occurred.

In an embodiment, the vehicle is a BEV or an EREV and the travel constraint is the amount of charge left in the vehicle.

Figure 3:
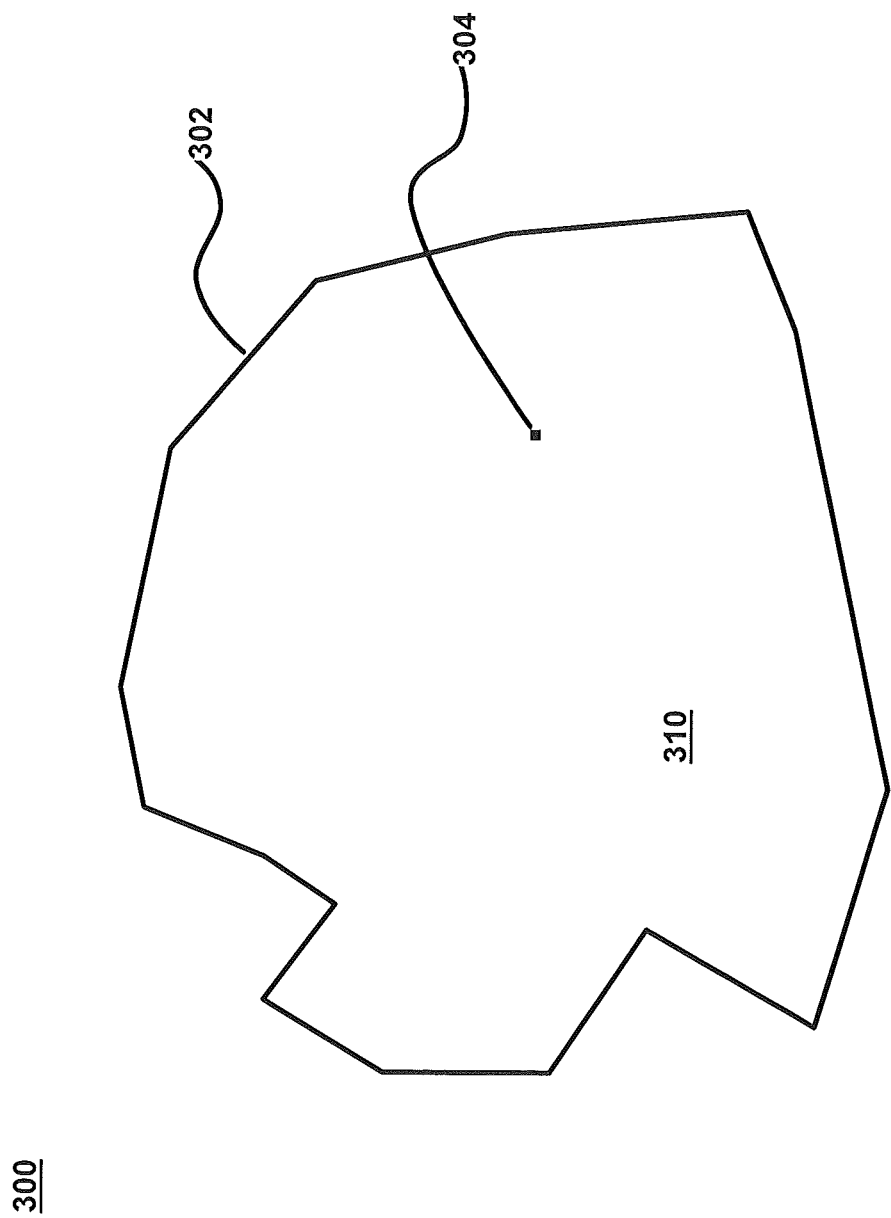
FIG. 3 is a sample range projection image for a vehicle at a point prior to a service interruption in accordance with an exemplary embodiment of the invention.

At step 202 in FIG. 2, the vehicle receives data from the host system 118 through the range projection logic 116 and satellite information relating to the vehicle's GPS location. The range projection estimation logic 114 of the vehicle stores a snapshot of the data and satellite information in the storage device 108 at step 204, which data and information correspond to the projected range the vehicle is capable of traveling at that point in time factoring in the vehicle's current or remaining energy availability. A graphical display 300 illustrating a visual representation of a projected travel range 310 within a boundary 302 is shown in FIG. 3. As illustrated in FIG. 3, the boundary 302 has a polygon shape. A dot 304 within the boundary 302 represents the current location of the vehicle 120 at the time the snapshot is taken.

At step 206, the range projection estimation logic 114 determines whether an interruption in service (e.g., connection to the host system 118 and/or networks 106) has occurred. This information may be provided to the range projection estimation logic 114 via, e.g., the processor 102 in communication with an antenna of the vehicle. If no interruption is noted at step 206, the process returns to step 202 whereby the vehicle continues to receive data from the remote service (e.g., the host system 118) and a new, updated snapshot is captured and stored at step 204.

Figure 4:
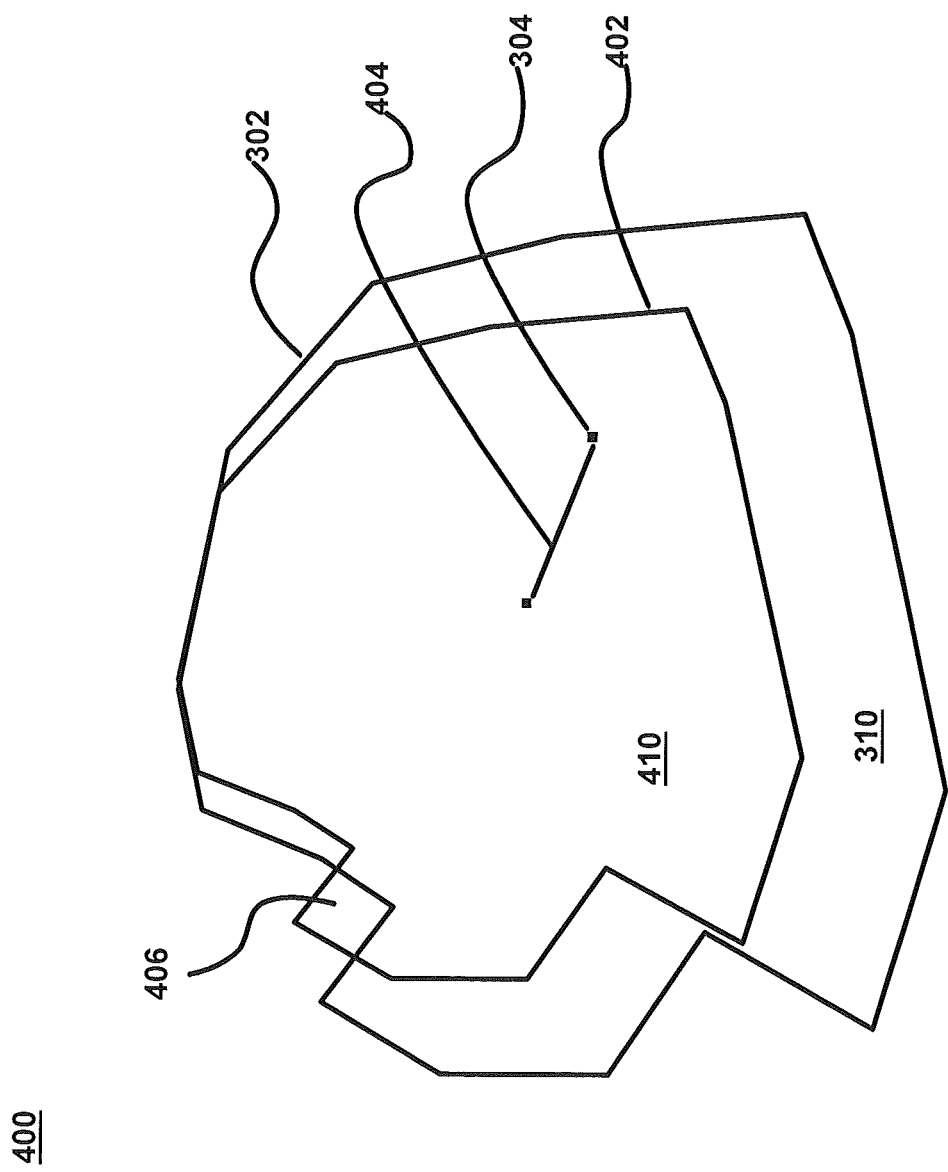
FIG. 4 is the sample range projection image of FIG. 3 overlaid by an estimated range projection image for the vehicle subsequent to a service interruption or delay in accordance with an exemplary embodiment of the invention.

Otherwise, if a service interruption has occurred at step 206, the range projection estimation logic 114 scales the projected travel range 310 at step 208, based on a fraction of remaining energy used by the vehicle since the previous snapshot. Thus, as shown in FIG. 4, a graphical display 400 illustrates a visual representation of a scaled projected travel range 410 within a boundary 402 having a polygon shape. The scaled projected travel range 410 is shown proportionately smaller than the projected travel range 310 of FIG. 3 (also referred to as a reference polygon). In addition, at step 210, the scaled projected travel range 410 is translated relative to the reference polygon based on a change in the vehicle location 404. Thus, as shown in FIG. 4, the scaled projected travel range 410 is shifted in the same direction and proportion as the direction and proportion of movement (movement 404) of the vehicle. The movement 404 of the vehicle may be determined by GPS, dead reckoning, or similar methods.

Figure 5:
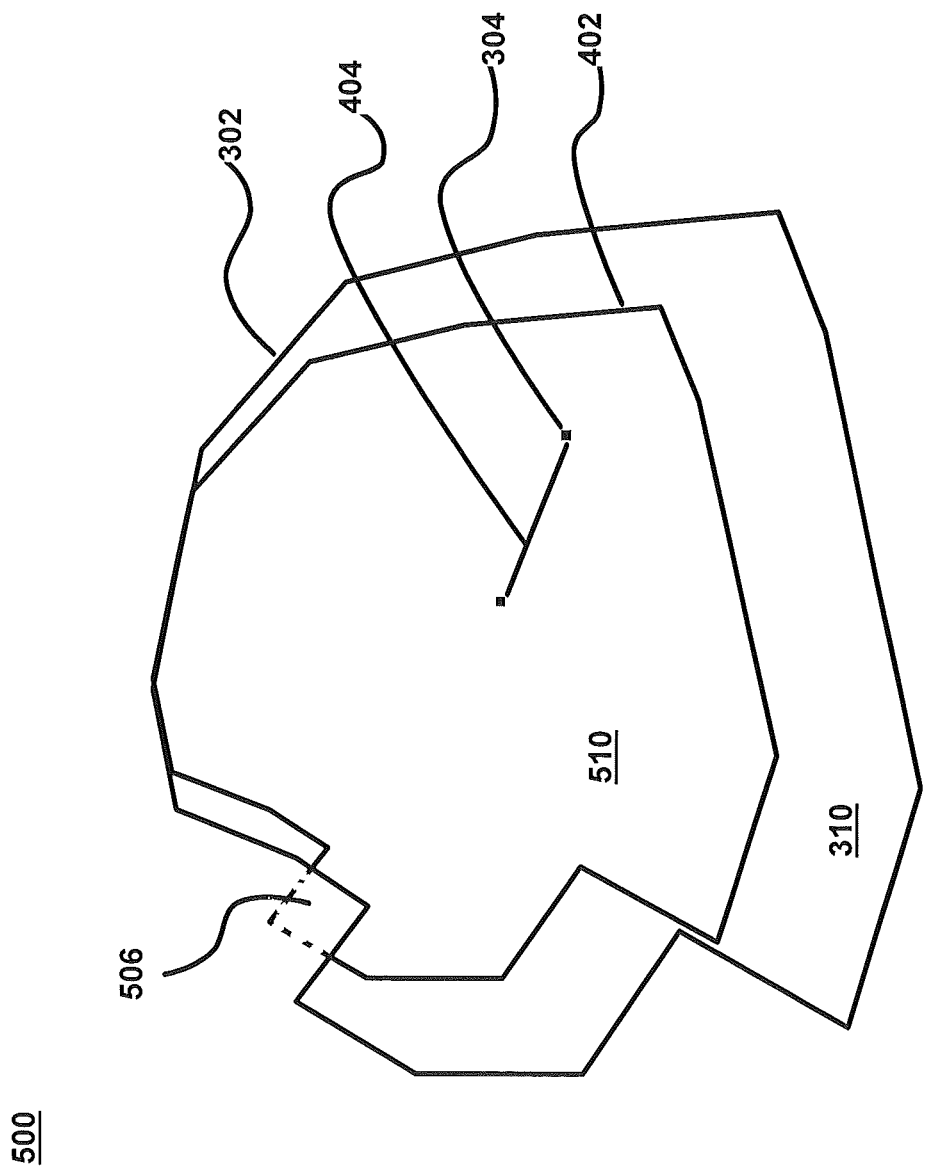
FIG. 5 is the sample range projection of FIG. 3 overlaid by the estimated range projection of FIG. 4 after eliminating an out-of-bound area in accordance with an exemplary embodiment of the invention.

At step 212, the scaled projected travel range 410 is clipped at locations that are outside of the boundaries set by the reference polygon. FIG. 4 illustrates an out-of-bound location 406. As shown in a graphical display 500 of FIG. 5, this area is represented in dotted lines 506 to indicate its removal. The clipped and scaled projected travel range 410 may be used by the range projection estimation logic 114 to provide a low resolution estimated range projection through the vehicle's navigation system display (e.g., display device 104 of FIG. 1). The low resolution estimated range projection may be integrated and correlated with a physical map, e.g., via the mapping engine 110, such that the scaled and clipped projected travel range represents a particular geographic region and associated range of travel.

At step 214, the range projection estimation logic 114 determines whether the service has returned to the vehicle. If not, the logic 114 uses the clipped and scaled projected travel range as its basis for a new reference polygon at step 216 and the process returns to step 208.

If, however, the service has been returned at step 214, the process returns to step 202 whereby the vehicle begins to receive data once more.

In an alternative embodiment, in lieu of providing the clipped and scaled projected travel range, the system may generate a coarse range projection using a map having less information than what is available off-board. In a further alternative embodiment, learned range projection polygons from previous driving experiences may be used to interpolate a new polygon. In yet a further embodiment, the vehicle may download from the host system 118 multiple polygons, which correspond to likely position and state of charge conditions. These may be interpolated to create a range projection polygon.

Technical effects include the ability to perform estimated range projections for a vehicle when remote service is interrupted or delayed. When a service interruption occurs that prevents the remote network system from calculating the projected travel range of the vehicle, the system enables the vehicle to utilize a snapshot of the most recent range projection information, as well as other data from the vehicle, to estimate a travel range without the benefit of the remote network system.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A system for providing vehicle range projection estimation, the system comprising:
    a computer processor disposed in a vehicle; and
    logic executable by the computer processor, the logic configured to implement a method, the method comprising:
        receiving vehicle range projection data from a remote system over a network as a network service, the vehicle range projection data representing a bounded geographic area in which the vehicle is capable of traveling, the bounded geographic area defined by global positioning system coordinates attributable to the vehicle in conjunction with an available amount of remaining energy of the vehicle;
        storing the vehicle range projection data in a storage device; and
        upon determining an interruption in the network service has occurred:
            retrieving stored vehicle range projection data from the storage device;
            scaling the stored vehicle range projection data to a level commensurate with an updated amount of remaining energy of the vehicle; and
            displaying, on a display device, a visual representation of scaled vehicle range projection data in the vehicle.

2. The system of claim 1, wherein upon determining the network service has returned, the method further comprises:
    removing the vehicle range projection data from the storage device; and
    capturing updated vehicle range projection data from the remote system; and
    storing the updated vehicle range projection data in the storage device until a next vehicle range projection data is received.

3. The system of claim 1, wherein the method further comprises:
    translating, as a function of the visual representation, the scaled vehicle range projection data relative to the stored vehicle range projection data based on a change in location of the vehicle.

4. The system of claim 3, wherein the method further comprises:
    removing, as a function of the visual representation, a portion of translated scaled vehicle range projection data that exceeds a boundary of the scaled vehicle range projection data.

5. The system of claim 1, wherein the visual representation is depicted as a polygon shape.

6. The system of claim 1, wherein the visual representation is a low resolution map based on the vehicle range projection data retrieved from the storage device.

7. The system of claim 1, wherein the visual representation is one of a plurality of stored visual representations that is selected based on a previous driving experience.

8. The system of claim 1, wherein the visual representation is one of a plurality of visual representations downloaded from the remote system prior to the interruption in the network service, the plurality of visual representations corresponding to presumed locations and state of charge conditions.

9. A method for providing vehicle range projection estimation, the method comprising:
    receiving vehicle range projection data from a remote system over a network as a network service, the vehicle range projection data representing a bounded geographic area in which the vehicle is capable of traveling, the bounded geographic area defined by global positioning system coordinates attributable to the vehicle in conjunction with an available amount of remaining energy of the vehicle;
    storing the vehicle range projection data in a storage device; and
    upon determining an interruption in the network service has occurred:
        retrieving stored vehicle range projection data from the storage device;
        scaling the stored vehicle range projection data to a level commensurate with an updated amount of remaining energy of the vehicle; and
        displaying, on a display device, a visual representation of scaled vehicle range projection data in the vehicle.

10. The method of claim 9, wherein upon determining the network service has returned, the method further comprises:
    removing the vehicle range projection data from the storage device; and
    capturing updated vehicle range projection data from the remote system; and
    storing the updated vehicle range projection data in the storage device until a next vehicle range projection data is received.

11. The method of claim 9, further comprising:
    translating, as a function of the visual representation, the scaled vehicle range projection data relative to the stored vehicle range projection data based on a change in location of the vehicle.

12. The method of claim 11, further comprising:
    removing, as a function of the visual representation, a portion of translated scaled vehicle range projection data that exceeds a boundary of the scaled vehicle range projection data.

13. The method of claim 9, wherein the visual representation is depicted as a polygon shape.

14. The method of claim 9, wherein the visual representation is a low resolution map based on the vehicle range projection data retrieved from the storage device.

15. The method of claim 9, wherein the visual representation is one of a plurality of stored visual representations that is selected based on a previous driving experience.

16. The method of claim 9, wherein the visual representation is one of a plurality of visual representations downloaded from the remote system prior to the interruption in the network service, the plurality of visual representations corresponding to presumed locations and state of charge conditions.

17. A computer program product for providing vehicle range projection, the computer program product comprising a computer-readable storage medium encoded with instructions, which when executed by a computer cause the computer to implement a method, the method comprising:
    receiving vehicle range projection data from a remote system over a network as a network service, the vehicle range projection data representing a bounded geographic area in which the vehicle is capable of traveling, the bounded geographic area defined by global positioning system coordinates attributable to the vehicle in conjunction with an available amount of remaining energy of the vehicle;

storing the vehicle range projection data in a storage device; and upon determining an interruption in the network service has occurred:

retrieving stored vehicle range projection data from the storage device;

scaling the stored vehicle range projection data to a level commensurate with an updated amount of remaining energy of the vehicle; and displaying, on a display device, a visual representation of scaled vehicle range projection data in the vehicle.

18. The computer program product of claim 17, wherein upon determining the network service has returned, the method further comprises:

removing the vehicle range projection data from the storage device; and capturing updated vehicle range projection data from the remote system; and storing the updated vehicle range projection data in the storage device until a next vehicle range projection data is received.

19. The computer program product of claim 17, wherein the method further comprises:

translating, as a function of the visual representation, the scaled vehicle range projection data relative to the stored vehicle range projection data based on a change in location of the vehicle.

20. The computer program product of claim 19, wherein the method further comprises:

removing, as a function of the visual representation, a portion of translated scaled vehicle range projection data that exceeds a boundary of the scaled vehicle range projection data.

* * * * *